Sept. 3, 1963   J. N. G. DECHENE   3,102,301
MELT LEVEL ALARM
Filed Nov. 1, 1962

INVENTOR
JOSEPH NAPOLEON GERARD DECHENE

BY *Harry E. Braddock*
ATTORNEY

United States Patent Office 3,102,301
Patented Sept. 3, 1963

3,102,301
MELT LEVEL ALARM
Joseph Napoleon Gerard Dechene, Laurel, Del., assignor to E. I. du Pont de Nemours and Company, Wilmington, Del., a corporation of Delaware
Filed Nov. 1, 1962, Ser. No. 234,775
7 Claims. (Cl. 18—8)

This invention relates to the melt spinning of yarns, filaments, ribbons, and the like from solid organic filament-forming compositions, such as nylon polymer flakes, which have a tendency to change their chemical composition while in the molten state and, more particularly, it relates to an improved electrode arrangement for detecting the presence or absence of a predetermined minimum level of such molten material in the melt pool of a grid-type melter apparatus.

The continuous melt spinning of filaments, ribbons, and other structures from molten structure-forming compositions produced in grid-type melters presents numerous process difficulties resulting from the effects of decomposition of the molten structure-forming composition. Frequently, two or more of these effects occurred simultaneously. Great difficulty has been encountered in an attempt to compensate for these effects by carefully controlling variables such as the melting temperature, the rate of metering, pressure, rate of draw-off of the extruded structures, etc., while concurrently producing structures (or preferably filaments as hereinafter recited) of high quality and uniform physical properties.

Graves, in U.S. 2,253,176, and Waltz, in U.S. 2,571,975, disclose methods for minimizing the difficulties resulting from the effects of decomposition of molten filament-forming compositions. They cover methods of continuously melting polymer flakes by means of grid heaters, then allowing the molten filament-forming composition to flow to a reservoir of restricted volume. The molten material is then withdrawn by suitable means, such as a melt pump, in constant amount to an extruding device. The inventory of molten material in the reservoir, or pool, is preferably kept small in order to prevent prolonged residence in the pool and decomposition of the molten material.

Pierce, in U.S. 2,683,073, discloses another highly desirable structural feature for the grid-type melter apparatus. It involves the positioning of a stirrer in the melt pool for minimizing gel formation on surfaces within the melter that are exposed to the molten material.

As long as there is no decomposition in a grid melter resulting from an excessive amount of molten material forming in the melt pool, and polymer flake flow is constant, a high quality melt having uniform physical properties is usually obtained. However, occasionally the rate of melt formation drops below its predetermined theoretical rate established by control over process functions such as flake feed rate, sizing of grid elements, and grid temperature. For example, occasionally some of the polymer flakes may bridge above the grid and not come quickly into contact with the grid. As a result, the volume of melt in the melt pool diminishes to the extent that bubble-containing material adjacent the upper surface of the melt is prematurely drawn out of the melt pool by the melt pump and is impelled into the extruding assembly along with any other quality melt still being formed. This causes an undesirable denier change in the filaments being spun.

The resulting off-denier yarn is impossible to detect without costly testing procedures. And, while the bridging of polymer flakes may quickly collapse so that a sufficient melt level is once again attained for proper denier production, the entire resulting yarn becomes substantially unsalable product. Therefore, it is essential to know at once when the level of the melt pool has fallen below the predetermined minimum level causing hidden variable denier filament production.

It is also essential to know at any given time whether or not the particular melt level sensing device being used is operating satisfactorily.

Numerous methods of determining the quantity of liquid in the melt pool have been suggested in the prior art. One particularly rapid and accurate method is by means of electrical conductivity since molten filament-forming compositions exhibit sufficient electrical conductivity. A meter reading, or indication, may be made in terms of the electrical resistance in an electrical sensing circuit established between a charged electrode assembly in the melt and a grounded electrode or part of the melter apparatus, or it may be made in terms of current flowing through such a circuit. Prefereably, any well-known multi-point resistance measurement device may be used to monitor sequentially in a short interval, a number of individual grid melters arranged for simultaneous melt spinning operation.

In general, according to known systems, so long as the measured resistance is lower than a preset level, it may be assumed that the level of the melt pool is above the predetermined minimum level and is sufficient to assure continuous uniform denier production. When the resistance increases beyond the preset level, a suitable signal or indication such as an audible or visual warning means is initiated so that prompt corrective action may be taken with respect to the malfunctioning melter. However, in actual practice, many false alarms or alarm failures have occurred due to improper or inaccurate liquid sensing. Many times the false indication of sensing circuit being in the open or closed condition is caused by semi-conductance or other abnormal conductance between the electrode assembly and other melter elements closely confined within the relatively small melt pool region. At times a false indication occurs when, although the pool is substantially empty with the actual melt level below the charged electrode assembly, the sensing circuit is completed through a coating of gel or a meniscus of residual polymer linking the charged electrode and other grounded parts of the melter. These conditions are most undesirable. At other times a false indication occurs when, although the melt pool is full, the sensing circuit is interrupted by occluded gases or gaseous degradation products surrounding the electrode.

It has been found after investigation and experimentation that there are a number of critical parameters surrounding desirably rapid, accurate, and continuous electrode operation with a relatively long operating life. Certain of these critical parameters relate particularly to the immersed electrode's electrically conductive surface portion, or sensing tip which is exposed to the molten material during normal melt spinning and also relate to the material of which the sensing tip is constructed. Other parameters involve considerations of precisely positioning and arranging the electrode's sensing tip relative to the desired operating melt level and the other structural elements confined within the vicinity of the small melt pool, and also the positioning of the other structural elements with respect to the desired operating melt level.

It is therefore an object of this invention to provide an improved, reliable sensing arrangement for quickly ascertaining when the actual surface level of molten material in a grid-type melt spinning apparatus has dropped below a preset surface level causing off-denier filament production.

Another object of this invention is to provide such an improved level sensing or detection arrangement which has a long life of reliable operation at elevated temperatures and corrosive operating conditions.

Still another object of this invention is to provide such an improved apparatus arrangement in which false signalling and signal failures of the sensing circuit are eliminated and in which it can quickly be determined whether or not the sensing circuit is operating satisfactorily.

The objects of the invention generally are accomplished by an improved and novel arrangement of components in a grid-type melt spinning apparatus which arrangement involves the positioning of the components with respect to each other as well as to the desired operating level of the melted material, and also involves a particular configuration of the sensing element itself. More specifically the sensing element is positioned so that the stirring element generates a periodic signal which appears whether or not the level of the melt is above or below the desired level. This makes it possible to determine quickly whether the sensing arrangement is functioning satisfactorily. In addition, the sensing element is positioned so that the major variation in resistance and/or current occurs when the melt level dips below the point of contact with the melt grid and such major variation occurs independently of gel formation which may electrically link the sensing element with other lower grounded portions of the apparatus.

Other objects and advantages will appear from a consideration of the following specification and claims, taken in conjunction with the accompanying drawing in which:

Figure 1:
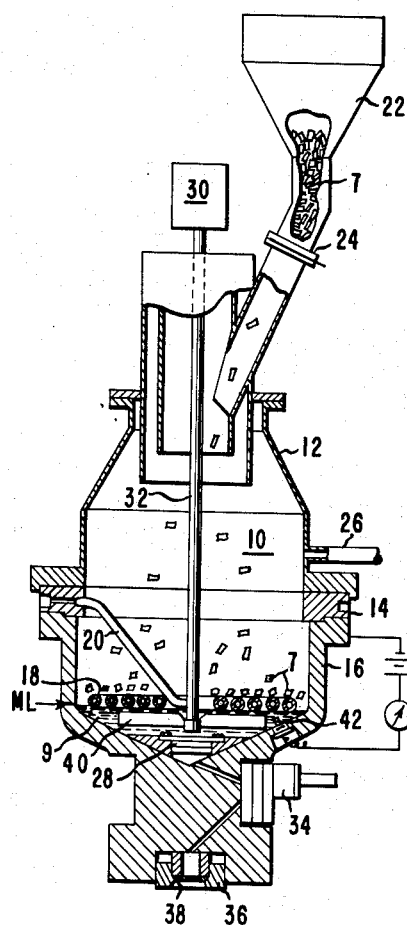
FIGURE 1 is a diagrammatic side representation, partly in section of a grid-type melt spinning apparatus.

In FIGURE 1, which illustrates one embodiment of this invention, reference 10 represents a melt chamber of substantially cylindrical cross-section formed by housing 12, grid flange 14, and pump block 16. These units may be insulated or they may be provided with suitable heating means. The chamber 10 is provided with a flat spiral metal coil or grid 18. The grid 18 is constructed of tubing and is supported from the grid flange 14 by one or more pieces of support tubing 20. The spiral coil grid 18 may be heated by various conventional means such as by positioning electrical resistance units at the interior thereof or by circulating a heating medium therethrough. A supply of solid pieces 7 of the material to be melted, e.g., flakes of nylon, is maintained in a supply hopper 22 and is controllably fed by a slide valve 24 into the melt chamber 10. If desired, an atmosphere of an inert gas or steam may be admitted to the melt chamber 10 through suitable steam piping 26. The flakes come to rest on the upper surface of the grid 18 which is heated to a temperature above the melting point of the organic filament-forming composition. The flakes melt on the upper surface of the grid 18 and the molten material 8 drains between the turns of the grid and forms a pool 9. A melt pump 28, driven by motor 30 and operatively associated therewith by means of a shaft 32, pressurizes the melt and maintains a constant supply pressure to the meter pump 34 which in turn meters the amount of the melt to the pack assembly 36 which contains a conventional spinneret 38. Fixedly attached to the shaft 32 is a two-bladed stirrer 40, or agitator. Mounted in the pump block 16 wall is an electrode assembly 42. Connected in series with the electrode assembly 42 is a battery 44 and a meter 46.

It is known that molten polymer is an electrical conductor and is a better conductor than air or other gaseous material. However, many problems have been encountered in the operation of known electrode assemblies to sense the level of the melt in conjunction with resistance measurement devices or meters. In solving these problems, the location of the electrically charged conductive electrode tip 48 and its physical configuration has been found to be very important. With a material 7 which decomposes and forms degraded products, some gaseous and some gelatinous (commonly called gel), it is essential that the electrode tip 48 be positioned outside of an area in the melt chamber which is sensitive to gel formation. Further, the electrode tip 48 itself must be designed so that any gel formation on it will not affect it deleteriously. It has been determined that the size of the face of the electrode tip 48 must be sufficiently large to minimize this effect. In addition, the tip 48 of the electrode must be constructed and arranged so that no meniscus of polymer or gel would form on it and in contact with the side wall of the pump block 16 forming an electrical circuit to give a false low resistance or high current signal indicating the presence of molten polymer when in fact none may exist in the melt pool chamber at that particular moment.

Figure 2:
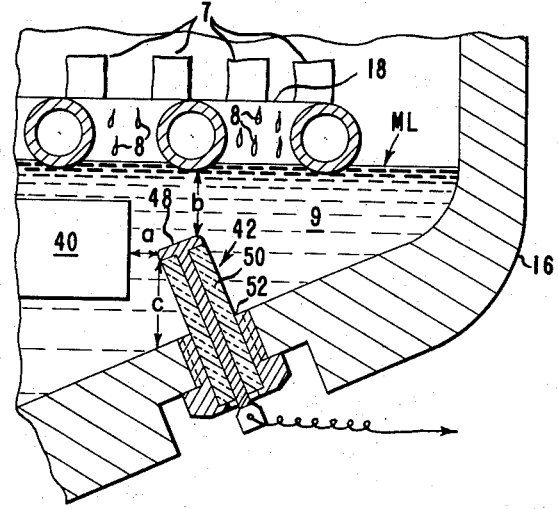
FIGURE 2 is an enlarged representation of a portion of the apparatus of FIGURE 1 showing in detail one embodiment of the electrode assembly, the melt being shown at the desired operating level.

One preferred embodiment of an electrode assembly 42, shown in FIGURE 2, comprises the electrically charged and conductive electrode tip 48 having a well rounded, or convex contour, and the other end shaped so that an electrical connection can easily be made to it. Surrounding the conductive electrode tip 48, and also forming a part of the electrode assembly 42, is an insulator 50 having a transverse dimension substantially the same as that of the tip and made of a suitable ceramic material such as aluminum oxide; a mounting nut 52 surrounds the insulator 50 and mounts the entire electrode assembly 42 into the wall of the pump block 16. The electrode is fabricated from an electrically conductive material, such as steel, aluminum, brass or copper. It must be durable under the particular temperatures, corrosive materials, stresses or other conditions to which it is exposed in use.

Normally, one might except to make the tip 48 of the electrode the same size as the section which is surrounded by insulator 50. However, it has been found that such an electrode configuration is extremely sensitive to gas bubbles in the melt, to gel forming between the insulation and the protruding electrode tip 48 and also to the formation of a meniscus of melt which provides a false sensing circuit path between the electrode and grounded structure of the apparatus. The enlarged tip 48 on the end of the electrode is necessary in order to help provide continuous operation, and to help maintain a continuous external resistance indication of normal melt functioning without false signalling. The rounding of the conductive electrode tip 48, as shown in FIGURE 2, makes the tip self-cleaning and helps prevent the formation of an undesirable electrically conductive mensicus of melt material. In addition, at the operating temperatures and, in particular, the temperatures required to clean the grid-type melters during overhaul, the end of the electrode 48 tends to become rapidly oxidized causing a change in the electrical resistance characteristics of the level indicating system. In order to stabilize these resistance characteristics and minimize such oxidation, the exposed end of electrode 48 is preferably plated with a suitable coating such as gold metal.

A further important feature of the invention involves the positioning of the electrode assembly 42 with relation to the positioning and functioning of the agitator 40 and grid 18. As shown in FIGURE 2, in the arrangement of this invention, the distance C must be greater than the distance B, which in turn must be greater than the distance A.

Since the electrical resistance of the molten polymer is considered substantially constant throughout the melt, when the extremity of the rotation stirrer 40 passes close to the electrode assembly 42, the resistance in the sensing circuit, being proportioned to distance A, drops to a minimum and increased current flows between the electrode 42 and the stirrer.

Then, as the extremity of the moving stirrer 40 moves away from the electrode tip 48, the resistance in the sensing circuit increases and current flow therein decreases to levels determined by the next closest element to the tip 48 which is the grid 18 at distance B. Meter 46 would then indicate a pulse or variation in resistance or current. If a continuous recording were made of the electrical resistance, with a constant level in the melt pool and the stirrer rotating, the resistance and current would be substantially constant except during the cyclic passing of tip 48 by the stirrer 40. This generates a periodic variation in the indicated signal at meter 46 which indicates satisfactory operation of the sensing circuit regardless of the fluctuation in the melt level within certain limits.

This periodically varied signal helps overcome the problem that arises when a body of leakage polymer solidifies around lead wires connecting the electrode assembly with the battery and meter. This condition results in at least a partial short circuit of the sensing arrangement which obviously is a low resistance high current situation normally indicative of satisfactory melt level which satisfactory level actually may not exist at the time of the short circuit. However, since this would also substantially block out the periodically varied signal, the absence of the periodically varied signal is used as an indication of malfunction.

As indicated in the drawings, distance B is shorter than distance C. When the level of the melt pool is above or at the desired operating level as shown in FIGURE 2 it will be clear that two simultaneous parallel electrical paths for the sensing circuit exist through the melt, one corresponding to distance B and the other to distance C. When the resistance corresponding to distance B is lower than the resistance corresponding to distance C, as is the requirement of this invention, the changes in resistance (and consequently current) due to a drop in the melt level below the bottom of the grid are more apparent and readily detected. This becomes especially significant since gel forms a layer on the surfaces of pump block 16 and electrode 48 which may cause the resistance existing in the path of the sensing circuit corresponding to distance C not to be properly related to the level of the melt pool. In other words, the primary level sensing action occurs in the space between the upper surface of the electrode 48 and the lower surface of the grid. Another advantage of this arrangement lies in the fact that the electrode 48 is always maintained beneath the surface of the melt which greatly minimizes gel formation thereon.

Another important requirement in the positioning of the conductive electrode tip 48 is that it be located in the upper low-bubble, relatively highly agitated or positive flow zone of the melt pool to minimize gas bubbles and excessive gel buildup around the electrode assembly 42. Hence, it is desirably positioned according to the previously mentioned requirements and also fairly close to the closest cyclic proximity of the stirrer 40, and close to the upper portion of the melt pool. To insure that the conductive electrode tip 48 is not in a stagnant region, the stirrer 40 is preferably a propeller-type stirrer. It may be somewhat S-shaped with a pitch such that it pulls molten polymer away from the electrode assembly 42 and forces new polymer to surround it. The stirrer also helps to force-feed the melt pool pump 28.

Figure 3:
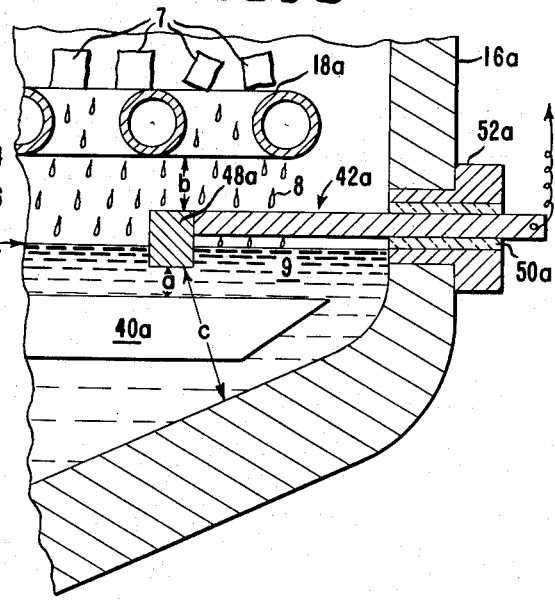
FIGURE 3 is also an enlarged representation of a portion of a modified embodiment of the electrode assembly shown in FIGURE 2.

FIGURE 3 depicts a modified version of the electrode assembly, in which the electrode assembly 42a is positioned between the melt grid 18a and the melt stirrer 40a. This electrode assembly 42a comprises components similar to those of the FIGURE 2 embodiment and may also be used in melt spinning apparatus such as the type shown in FIGURE 1. A mounting nut 52a engages pump block 16a, surrounds insulator 50 and supports the electrode 48a. In this instance, the electrode assembly 42a comprises a thin rod-like member in a cantilever mounting in the side wall of pump block 16 inwardly toward and slightly above the stirrer 40. The assembly 42a may be enlarged at its tip 48a to form a vertical cylinder, cube or other suitable geometrical shape. The spatial relationships described hereinbefore are desirably maintained in this embodiment; distance C being greater than distance B which, in turn, is greater than distance A. When it is possible to position and arrange the electrode assembly 42a in this manner between the melt grid 18 and stirrer 40, the enlarged conductive electrode tip 48a is situated in a moving stream of molten polymer and it has a greater tendency to avoid formation of gel which would interfere with its normal detecting function.

Meter or indicating means 46 can present an indication corresponding to the resistance between the charged electrode assembly and a grounded part of the unit, or corresponding to the current flowing in such a circuit. A conventional multi-position resistance or current measurement device may be used to monitor in sequence a plurality of such melt spinning arrangements. By allowing sufficient interval for monitoring each arrangement so that the periodic variation due to stirrer movement can be noted, the operability of each sensing circuit is established. As long as the resistance is lower, or the current higher than a preset level it is known that the melt pool level is above the minimum required level which corresponds to the bottom of the grid member in the arrangement of this invention and that continuous constant denier production should result. When the resistance increases or the current decreases with respect to a predetermined preset level the arrangement may be easily modified by addition of conventional means to sound an alarm and the necessary action taken.

It will be apparent in both versions of the apparatus that in addition to the significant variation in the resistance and current in the parallel branch of the sensing circuit corresponding to distance B when the melt level drops below the bottom of the grid, another significant variation would occur in the sensing circuit in the parallel branch circuit corresponding to distance C if the melt level should continue to drop below the lowermost portion of charged electrode 48. Thus the margin of safety and time for taking corrective action upon an indication of a troublesome drop in melt level, are effectively increased.

This improved melt level detection system and electrode assembly 42 has reduced variable denier production in a nylon melt spinning apparatus by a factor of seven or more, and the improved reliability has permitted an increase in the maximum spinning apparatus age from 24 days to 48 days, with indications that there is a potential increase to as great as 60 days of continuous operation.

This arrangement, while it has been described with molten nylon as the filament-forming composition, is equally applicable to any viscous conductive liquid, especially those which precipitate a degraded deposit. Further, means other than gold-plating the probe cap may be used to prevent surface oxidation or the acquisition of semi-conductor properties. Also, suitable means other than an S-shaped stirrer may be used to maintain sufficient polymer flow and agitation near the conductive electrode tip 48 of the electrode assembly 42.

It will be understood that various modifications could be made in the disclosed embodiments of this invention without departing from the spirit of the invention or the scope of the appended claims wherein:

1. An improved apparatus for melt spinning uniform denier filaments from an electrically conductive filament-forming composition, said apparatus comprising a melt chamber structure for receiving said composition as solid particles, a heated grid mounted in said chamber structure for receiving and melting said solid particles, said melt chamber structure defining a melt reservoir having a given restricted volume for receiving and containing the molten composition from the heated grid, a movable agitator positioned within said reservoir for minimizing gel formation in said apparatus during melt spinning, and means for withdrawing the molten composition from a lower portion of the reservoir and supplying said composition under pressure to a filament spinning unit in a constant, uniform manner, an electrode assembly fixed in said melt chamber structure for sensing the presence of a predetermined minimum level of molten composition in the melt reservoir, said electrode assembly comprising an electrically charged and conductive electrode having a tip portion positioned and arranged adjacent the path of movement of said agitator in a low-bubble, positive flow zone of the melt reservoir so that an effective electrical sensing circuit may be continuously maintained through the molten composition so long as said conductive electrode tip and said grid are in contact with a portion of the molten composition and an indicating means electrically connected with said sensing circuit and charged electrode to indicate the condition of the circuit and corresponding position of the melt level.

2. The improvement of claim 1 wherein the conductive electrode tip is positioned with respect to the grid, the nearest point of approach of the movable agitator and the nearest structure defining the reservoir so that the distance between said tip and the nearest point of approach of the agitator is shorter than the distance of the tip from the grid and said nearest structure, and the distance of said tip from said grid is shorter than the distance of said tip from said nearest structure defining the reservoir.

3. The improvement of claim 2 wherein the conductive electrode tip is formed of an electrically conductive material capable of withstanding high temperatures, corrosive conditions, and fluid flow stresses.

4. The improvement of claim 3 wherein the conductive electrode tip is gold-plated to withstand exposure of said tip to high oxidation temperatures conductive to causing changes in electrical resistance characteristics.

5. The improvement of claim 4 wherein the conductive electrode tip's large contact surface is shaped in a substantially convex manner for self-cleaning action and reducing the formation of a molten composition meniscus thereon during operation of the apparatus.

6. An improved arrangement for electrically sensing and indicating the level of a conductive liquid material in an apparatus comprising an electrically grounded housing structure defining a heating chamber, a heater member mounted on said structure and positioned at a certain level in the chamber, an agitator unit movably mounted in said chamber, said arrangement comprising an electrically conductive electrode positioned in said chamber and mounted in said housing structure, said electrode electrically insulated from said housing structure, an electrical voltage source operatively connected to said electrode, an electrical indicating means operatively connected with said voltage source and said electrode, said electrode provided with an extremity projecting into said chamber to a position at a level below the level of said heater member, the position of said extremity spaced at a distance from the nearest inner portions of said housing structure defining the heating chamber, greater than its distance from said heater member and greater than its distance from the nearest point of approach of said movable agitator, the distance between said position and said heater member being greater than the distance from said position and the nearest point of approach of said agitator to said position, said voltage source of sufficient potential to maintain concurrently a first sensing circuit path in a conductive liquid between said electrode extremity and said heater member when the level of a conductive liquid in said chamber is at least at the level of said heater member, a second sensing circuit path in the conductive liquid between the electrode extremity and the nearest inner portions of said housing structure defining the structure, and third a periodically established third sensing current path between said extremity and said agitator when said movable agitator is at its closest point of approach to said extremity; said indicating means, said electrode and said heater member cooperating with a conductive liquid in said chamber to show a significant change in indication when the liquid level drops below the level of said heater member.

7. An improved method for indicating satisfactory operation of an apparatus for handling an electrically conductive liquid, said apparatus comprising an electrically grounded housing structure defining a heating chamber, a heating unit mounted on said structure in said chamber, an agitator for the liquid movably mounted in said chamber, a charged electrode electrically insulated from and mounted on said structure and projecting into said chamber, an electrical voltage source operatively connected to said electrode and an electrical indicating means operatively connected with said electrode and said source to indicate a change in a sensing circuit existing in the liquid between the electrode and said structure when the liquid fails to contact both the electrode and said grounded structure, said method comprising the steps of applying a sufficient voltage to establish a sensing circuit between said electrode and said structure when a contained liquid contacts both, and simultaneously maintaining a sufficient voltage between said electrode and the agitator at its closest point of approach to said electrode to establish a separate sensing circuit temporarily between said electrode and said agitator when at said closest point of approach and periodically indicate establishment of the separate sensing circuit on said indicating means and show satisfactory functioning of the agitator and the sensing circuit.

References Cited in the file of this patent
UNITED STATES PATENTS
2,978,746    Rodenacker _____ Apr. 11, 1961